United States Patent [19]

Miller

[11] Patent Number: 4,919,041

[45] Date of Patent: Apr. 24, 1990

[54] BREWING AND DISPENSING SYSTEM AND METHOD FOR ICED TEA

[76] Inventor: Harold F. Miller, 107 Winston Way, Goose Creek, S.C. 29445

[21] Appl. No.: 288,573

[22] Filed: Dec. 22, 1988

[51] Int. Cl.$^5$ .................................... A47J 31/00
[52] U.S. Cl. .................................... 99/279
[58] Field of Search ............. 99/279, 275, 280, 282, 99/285, 323.3; 426/433, 597

[56] References Cited

U.S. PATENT DOCUMENTS

| | | |
|---|---|---|
| Re. 32,179 | 6/1986 | Sedam et al. |
| 2,440,365 | 4/1948 | Copping et al. |
| 2,838,077 | 6/1958 | Cooper .................................... 99/279 |
| 2,894,377 | 7/1959 | Shikles, Jr. et al. |
| 3,011,426 | 12/1961 | Mueller .................................... 99/275 |
| 3,294,552 | 12/1966 | Topalian. |
| 4,790,239 | 12/1988 | Hewitt .................................... 99/279 |

OTHER PUBLICATIONS

KMC Beverage Support Systems, "Bulk-T High Volume Tea Brewer", Apr. 1, 1986.
Bunn-O-Matic Corporation, "Fresh Brewed Iced Tea from Bunn-O-Matic Real Tea, Not Instant", May, 1987.
Zesco Products, "Beverage Service".

"Red Rose Is America's Fastest-Growing Tea", Aug. 1987.

*Primary Examiner*—Robert W. Jenkins
*Attorney, Agent, or Firm*—Sixbey, Friedman, Leedom & Ferguson

[57] ABSTRACT

A brewing and dispensing system for iced tea, particularly presweetened iced tea, which is especially well-suited for use in a fast food restaurant is provided. This system includes brewing means for brewing a supply of fresh tea, a supply of sweetener formulated to remain liquid in a chilled condition, chiller means for maintaining the tea and sweetener in a chilled condition, circulating means for maintaining the chilled tea and sweetener under constant circulation, and dispenser means for dispensing presweetened tea having a preselected ratio of sweetener and tea at one or a plurality of locations. A compressor means propels the sweetener and the tea under pressure from each supply to the chiller and from there to the dispenser. Undispensed tea and sweetener are circulated from the dispenser means back to the chiller means and are kept constantly circulating until dispensed. An alarm, including fluid level detection means is also provided to insure that the proper levels of the tea and sweetener supplies are maintained while the system is in operation. Water supply means, valve means and drain lines are further provided to enable the system to be easily flushed and sanitized.

16 Claims, 2 Drawing Sheets

BREWING AND DISPENSING SYSTEM AND METHOD FOR ICED TEA

TECHNICAL FIELD

The present invention relates generally to beverage dispensing systems for the food service industry and particularly to a brewing and dispensing system for iced tea.

BACKGROUND ART

Americans have enjoyed the pleasures of drinking iced tea for almost a century. According to one account, the beverage had its origins in the late 1800s as "iced tea a la Russe" and was so named because it was served in tall glasses as the Russians served hot tea. Another story credits a hot Englishman visiting the St. Louis World's Fair in 1904 with chilling his hot tea and thus giving the country a new cold drink. Whatever the precise origin of this refreshing beverage, it is currently enjoyed by ever-increasing numbers of tea drinkers, particularly when the weather is warm. A recent survey confirmed that tea consumption has increased substantially over the last several years. In the last year alone, tea consumption in the United States was about 7½ gallons per person. Many iced tea drinkers, moreover, especially those in the Southeastern United States, prefer to drink their iced tea sweetened.

With greater frequency, large numbers of these iced tea drinkers are purchasing their iced tea at fast food restaurants. However, the iced tea brewing and dispensing systems currently available to the food service industry for use by fast food restaurants are somewhat archaic in comparison to the systems available for dispensing other beverages and, further, most do not dispense presweetened tea.

Depending on the size and activity of the restaurant, iced tea is currently provided to customers in a variety of ways, from simply pouring the tea from a supply stored in a jar or the like that was prepared by employees with boiling water and loose tea or tea bags, much as it would be done in the home, to dispensing the tea from a premixed concentrate mixed with water. The first method is obviously time consuming, and the tea produced is likely to vary substantially from batch to batch, depending upon the care taken by the employee charged with the responsibility for brewing it. Consequently, this method is not a cost-effective way to produce fresh tea of consistently high quality for a restaurant with a large volume beverage business. Although the dispensing of tea from a premixed concentrate may require less labor and time than brewing tea by the batch, the tea dispensed from such a concentrate simply does not have the same taste as freshly brewed tea. In addition, if the concentrate also contains sugar or another sweetener, it must be handled carefully after it is opened to minimize microbial growth.

Automatic tea brewers are available that brew tea from real tea leaves and, therefore, produce a tea of good quality. However, these units combine the brewing and dispensing apparatus in a single countertop unit, which in many restaurants is unacceptable because scarce countertop space must be dedicated to this equipment. Other available tea dispensing equipment includes a tea brewer which may be located in any convenient space separate from a dispenser, which usually includes a three to five gallon storage tank. However, these dispensers must be located on a countertop easily reached by restaurant employees filling beverage orders and therefore have similar space requirements as the combination tea brewer and dispenser. One currently available iced tea brewing and dispensing system does include a tea storage tank at a location remote from the dispensing location and requires only an additional beverage dispensing spout rather than additional countertop space for dispensing the tea. However, this tea brewing system, like those previously mentioned, requires near boiling water for brewing the tea. Therefore, even though the tea is stored at room temperature once it has been brewed and will not cause much of the added ice to melt when it is dispensed from the tea storage container, the freshly brewed tea is quite warm and will readily melt ice. As a result, the restaurant patron who has the bad fortune to be the first one to order tea after a new batch has just been brewed will find that he has a cup of tepid, watery tea rather than the cool iced drink he had expected.

The foregoing tea brewing and dispensing systems suffer from an additional disadvantage as a result of the relatively short period of time during which tea retains its flavor and remains fresh. Unlike many other beverages, even unsweetened tea may "spoil" and become unfit to drink after only several hours when it is stored at room temperature. The aforementioned tea brewing and dispensing systems, therefore, must be emptied of undispensed tea at least at the end of each day. If the tea is allowed to stand in the storage tank overnight or longer, mold and bacterial growth are likely, and stringent sanitization of the storage and dispensing equipment will be required. The iced tea concentrates currently available claim to have about a three month shelf life. However, once the container holding the concentrate has been opened, the tea is also likely to deteriorate in flavor and quality unless preservatives and flavor enhancers are added to the tea. Since many iced tea consumers drink tea because it is a "natural" product, the use of such additives is objectionable.

A growing segment of the iced tea market, especially in the Southeastern United States, prefers to drink presweetened iced tea. The only currently available presweetened tea suitable for dispensing in fast food and similar types of restaurants is in the form of a concentrate, which, as discussed above, suffers from some significant disadvantages. The presence of a sweetener in the concentrate, moreover, only increases the likelihood of bacterial and mold growth once the container is opened, in part because the container holding the concentrate is intended to be stored at room temperature. None of the other known tea dispensing systems provides for the inclusion of a sweetener to enable the dispensing of presweetened iced tea. Consequently, the restaurant employees must either manually add sweetener to the tea storage container prior to dispensing the presweetened tea or provide sweetener separately in a form that can be added to the tea by the restaurant patron after it has been dispensed into an ice-filled cup. The sweetener is typically in the form of dry granules of cane sugar or a sugar substitute packaged in individual serving sized packets and is usually given to the patron with a stirrer to assist in mixing the sweetener with the iced tea. However, as anyone who has ever sweetened iced tea in this manner knows, the dry granules do not readily dissolve in cold iced tea, and properly sweetened tea may be a rather elusive goal.

Available iced tea dispensing equipment is notoriously difficult to clean and sanitize properly. The dispensing nozzle heads tend to have an unacceptably high bacterial count unless they are cleaned thoroughly every night. Additionally the systems with tea storage reservoirs can be hard to clean and, therefore, unsanitary. When sweetener is added to the tea, maintaining a clean, sanitary system becomes more difficult.

Beverage dispensing systems for dispensing sweetened beverages, such as carbonated soft drinks, which take up little or no counter space and keep the soft drink syrup concentrate cool, thus avoiding spoilage, are known in the patent art. U.S. Pat. Nos. 2,440,365, 2,894,387 and Re. U.S. Pat. No. 32,179 illustrate such systems. However, the systems shown in these patents are designed to dispense only soft drink syrup concentrates and carbonated water, and there is no suggestion anywhere that such systems may be used to brew, sweeten and dispense freshly brewed, presweetened iced tea. Moreover, none of the syrups disclosed in the aforementioned patents would be suitable for sweetening iced tea.

The prior art, therefore, fails to provide either a system or a method for brewing and dispensing high quality, fresh presweetened iced tea which occupies minimal space, is easily cleaned and sanitized and maintained in a sanitary condition, and can be used in conjunction with existing beverage dispensing equipment to provide a ready supply of cool, fresh sweetened tea.

SUMMARY OF THE INVENTION

It is a primary object of the present invention, therefore, to overcome the disadvantages of the prior art and to provide a system and a method for brewing and dispensing iced tea which occupies little space and can be used in conjunction with existing beverage dispensing equipment to provide automatically a ready supply of cool, fresh, sweetened tea.

It is another object of the present invention to provide a system for brewing and dispensing presweetened and unsweetened iced tea wherein the apparatus for brewing, storing and sweetening the tea are provided in a location remote from the apparatus for dispensing the tea.

It is yet another object of the present invention to provide a system for brewing and dispensing presweetened iced tea, which maintains the tea and the sweetener under conditions which avoid stagnation and spoilage.

It is a further object of the present invention to provide a system for brewing and dispensing iced tea which is easily cleaned and sanitized and maintained in a sanitary condition.

It is a still further object of the present invention to provide a liquid sweetener suitable for use in a brewing and dispensing system for presweetened iced tea.

It is yet a further object of the present invention to provide a method for brewing and dispensing presweetened iced tea.

The aforesaid objects are satisfied by providing a brewing and dispensing system for iced tea wherein a supply of tea is freshly brewed and maintained under continuous circulation in a chilled condition in a first, storage location remote from but fluidically connected to a second, dispensing location. A supply of liquid sweetener, specially formulated to remain in a liquid state when chilled, is simultaneously maintained under continuous circulation in a chilled condition so that presweetened iced tea may be readily dispensed. Pump means are provided to circulate both the tea and the sweetener through chiller means. Air compressor means is provided to propel the tea and sweetener from their storage locations through respective tea and sweetener lines to the chiller and the dispensing location. The system further includes tea brewing means and may include a plurality of tea storage reservoirs. A dispensing means at the dispensing location includes a dispensing head which dispenses a mixture of tea and sweetener in a preselected ratio and preferably also includes a second head which dispenses only tea. Optional water filter means may be included in the system to insure that the water used to brew the tea is pure and free from elements that will affect the taste of the tea. In addition, water supply means may be provided to facilitate cleaning and sanitization of the system.

The present invention further provides a method of brewing and dispensing at a location remote from the brewing location, both presweetened and unsweetened iced tea. This method includes automatically brewing tea from fresh tea leaves, chilling the brewed tea and subjecting it to continuous circulation while simultaneously maintaining it in a chilled condition. A sweetener is prepared from a mixture of sucrose, corn syrup, fructose, honey and water in amounts selected to avoid crystallization of the syrup in the syrup lines, and this mixture is chilled and continuously circulated while it is maintained in a chilled condition. The chilled tea and chilled sweetener are mixed in a preselected ratio and then dispensed after mixing as presweetened tea.

Other objects and advantages will be apparent from the following description, claims and drawings.

BEST MODE FOR CARRYING OUT THE INVENTION

The growing popularity of iced tea has resulted in the offering of this beverage by increasing numbers of restaurants and food service outlets. However, as discussed above, currently available iced tea brewing storage and dispensing equipment presents some significant problems to the restaurant owner, most notably the large amount of scarce "up front" counter space required for the components, the often inconsistent quality of the beverage, and the difficulties encountered in maintaining the equipment in a sanitary condition. In contrast, the iced tea brewing and dispensing system of the present invention avoids these problems.

The present iced tea brewing and dispensing system is especially well suited for use by "fast food" and other types of restaurants and food service outlets in which the space for beverage dispensing is limited. All of the large major components of this system, except the dispensing apparatus, can be located wherever space is available since tea and sweetener lines can be whatever length is required to fluidically connect the brewing and storage components with the dispensing equipment as will be explained in detail hereinbelow. The tea is brewed substantially automatically with fresh tea leaves and preferably also with filtered water and, as a result, consistently has a good high quality flavor. Moreover, not only is the system significantly cleaner while in operation than existing commercial iced tea brewing and dispensing equipment, it is also much easier to clean and sanitize. The foregoing improvements are achieved by the tea brewing and dispensing system shown and described in conjunction with FIGS. 1 and 2.

Figure 1:
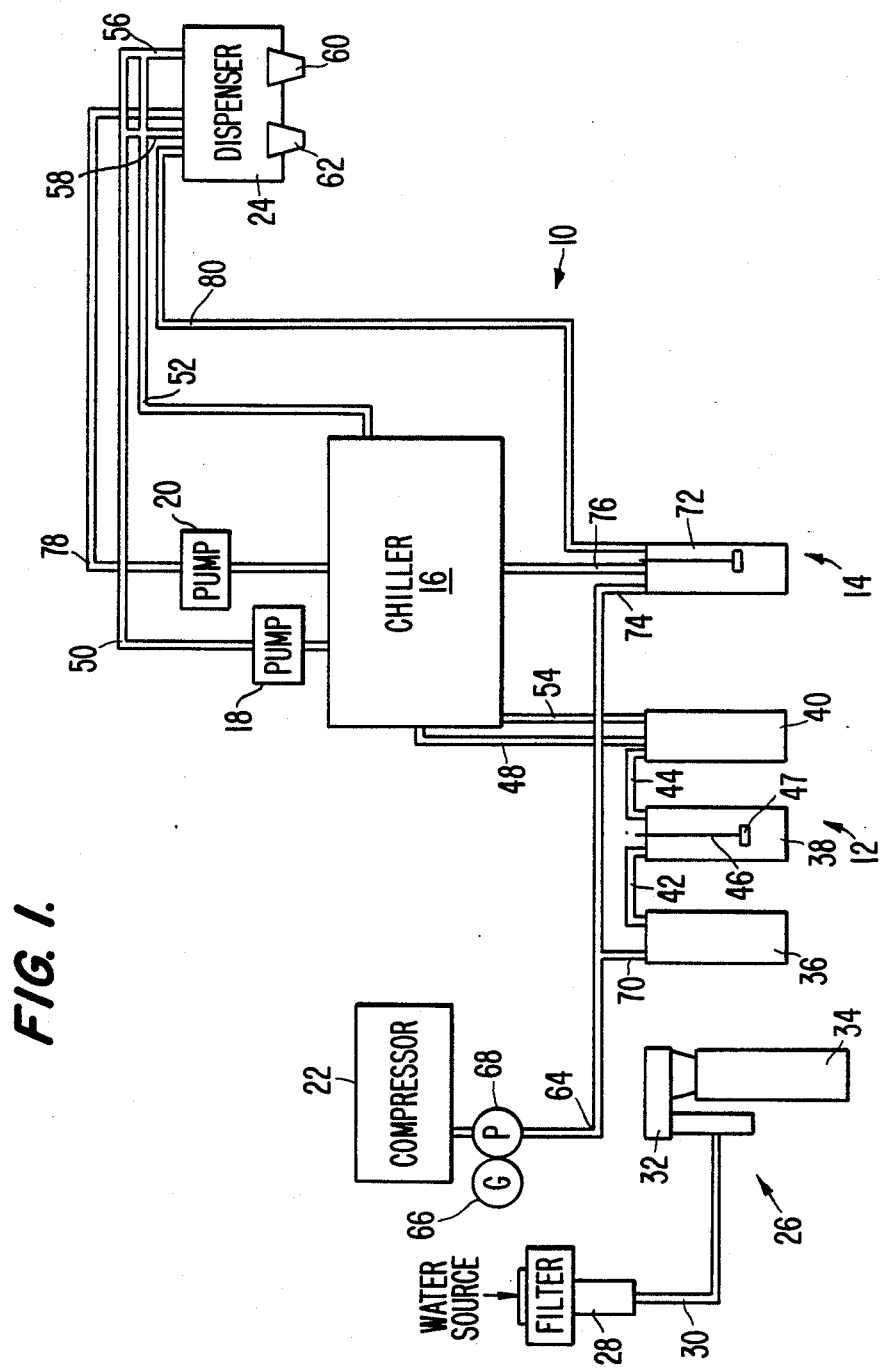
FIG. 1 is a schematic diagram of the iced tea brewing and dispensing system of the present invention.

Referring to the drawings, FIG. 1 is a schematic illustration of the present iced tea brewing and dispensing system 10. This system functions to store a supply of brewed tea 12 and a supply of liquid sweetener 14, to maintain a portion of the supply of tea and the sweetener under constant circulation in a chilled condition and to dispense both sweetened and unsweetened tea at a temperature that minimizes the amount of ice required to provide a high quality iced tea beverage. The basic components of the system are the tea supply 12, the sweetener supply 14, a chiller 16, a pair of circulating pumps 18 and 20, a compressor 22, a dispenser 24 and a plurality of fluid lines which provide the required fluid connections between the system components.

Tea brewing apparatus 26 is not required to be fluidically connected to the remainder of the system, but may be. If the tea brewing apparatus is not actually connected to the system, it is preferably located as close to the remainder of the system as possible for maximum convenience in operating the system.

In order for the present tea brewing and dispensing system to dispense high quality iced tea, a supply of freshly brewed high quality tea must be produced. To produce the best possible taste, the tea should be brewed from loose, fresh tea leaves that contain little or no "shake" or broken leaves. The water used to brew the tea should preferably be filtered to insure a high quality tea taste unaffected by the chemicals typically present in most municipal water supplies. Therefore, a preferred tea brewing apparatus 26 includes a filter 28 connected to a source of water (not shown). The filtered water then passes through a conduit 30 to a tea brewer 32. The filter 28 should be capable of removing chlorine and other substances that give water an off-taste. There are many commercially available types of water filtration equipment which will achieve this purpose. However, preferred for use in the instant system are the water filters containing a scale inhibitor to prevent scale buildup in the brewer available from Everpure, Inc. under the EVERPURE name.

The tea brewer preferred for use in the present system should be capable of brewing a large volume of high quality tea from tea leaves within a relatively short period of time. Such a tea brewer is available from KMC, an Alco Foodservice Company, Schaumburg, Ill., under the name "BULK-T." This type of tea brewer requires about 15 minutes to brew about five gallons of tea. In addition, the tea can be brewed directly into a transfer tank 34 of the kind that can be readily connected to pressurized beverage mixing and dispensing systems. Depending upon the size and beverage volume of the restaurant, fast food outlet or cafeteria where the present system is to be used, sufficient tea can be brewed to fill one or more five gallon transfer tanks so that a sufficient quantity of tea will be available in the tea supply 12 when needed. Because the quality of brewed tea may deteriorate relatively quickly, it is preferable to avoid building up a very large excess supply of brewed tea.

The tea supply 12, however, may include several tanks, such as the three tanks 36, 38 and 40 shown in FIG. 1. At least one tank or can should be available to function as a tea reservoir, and at least one tank or can should be available to hold the tea alarm. The tea alarm is activated when the level of tea in the system is below a predetermined low level. The alarm is preferably connected to both a light and an audible signal to alert restaurant personnel that the tea supply needs to be replenished. In the system configuration shown in FIG. 1, tank 40 is the tea reservoir, and tank 38 holds the tea alarm 46. The tea alarm may include the float portion 47 to sense when the tea in tank 38 is below a predetermined level. However, any sensing device that will activate an alarm when the tea level is too low may be used. Tank 36 provides an additional supply of tea. Consequently, in the FIG. 1 system an amount in excess of five gallons of tea will be dispensed before the alarm is activated.

Each of the tanks 36, 38 and 40 typically holds about five gallons of brewed tea and includes at least one inlet and one outlet (not shown), which are generally located on the top of each tank. These tanks should also be able to be pressurized as required to move the tea through the system. Suitable connectors (not shown) are provided at the inlet and the outlet to facilitate the connection of the tanks to the system. The tea supply tanks may be connected in series as shown in FIG. 1 to provide a tea supply of a known quantity. The tea supply in the three five gallon tanks 36, 38 and 40 shown in FIG. 1 would be approximately 15 gallons. The restaurant or fast food outlet should, therefore, be able to keep a supply of fresh tea readily available, even during peak serving hours, simply by maintaining the tea supply at the expected sales volume. The tea supply can then be easily replenished during slack serving times with freshly brewed tea. If the tea demand exceeds the supply, the tea alarm 46 will be activated, signaling that more tea is required.

Although not specifically shown in FIG. 1, all of the fluid carrying conduits and lines used in the present iced tea dispensing system are preferably the flexible hose-type lines widely used in commercial beverage dispensing systems. The type of flexible line used will typically depend on the space constraints of the restaurant. One type of tubing suitable for constricted spaces is vinyl tubing, such as Parker's PARFLEX. It may be desirable in some installations to cover the lines with insulation to prevent sweating. These flexible lines permit a wide range of possible configurations for the present beverage dispensing system. The flexibility of the lines allows system components to be positioned very close together since the lines can simply be bent as required to span a short distance. In addition, the small size and flexibility of these flexible lines facilitates fluid connection between system components that must be positioned some distance from each other and insures that these fluid connections will occupy very little space.

The three tanks 36, 38 and 40 of the tea supply 12 are connected in series by "jumpers" or flexible conduits 42 and 44. The conduit 42 connects tanks 36 and 38, and the conduit 44 connects tanks 38 and 40. A number of tea conduits, of which conduits 48, 50, 52 and 54 are shown in FIG. 1, are required to maintain the proper tea circulation in the present system. The fresh tea is circulated from the tea supply 12 to the chiller 16 where it is cooled to a temperature of about 38 degrees Fahrenheit. The cooled tea is then circulated through conduit 50 to the dispenser 24. If the dispenser is not actuated to dispense tea, the tea will return to the chiller by conduit 52 and from there back to the tea supply by conduit 54.

The present system starts with a high quality of freshly brewed tea and maintains this high quality at the dispenser by circulating the brewed tea through a chiller and maintaining it in a chilled condition. Because the tea is dispensed at a lower temperature than the dispensing temperature of known tea dispensers, less ice is required to produce a cup of iced tea. As a result, the tea flavor is not diluted by excess ice.

One chiller that has been found to function effectively in the present system includes a ¾ horsepower compressor and refrigeration unit, a reservoir, a temperature control, a thermostat and a bleed valve. Such a chiller is manufactured by Automation Projects, Inc. of Highland Park, Ill. Coils through which the tea can circulate through the chiller are also provided. A circulating pump 18 may be controlled by the chiller thermostat (not shown) to maintain the desired tea temperature. As previously noted, a temperature of about 38 degrees F. has been found to be an optimum temperature for the chilled tea.

Alternatively, the tea could be circulated through a suitable reservoir located in a walk-in cooler of the kind employed by most restaurants to maintain food and drink in a chilled condition. Further, to the extent that a restaurant's space and unused capacity are available, a restaurant's existing beverage cooling system could be modified to chill the circulating tea so that a separate chiller 16 would not be required. Any other device and/or arrangement which functions effectively to maintain a circulating volume of tea at about 38 degrees F. could be utilized instead of the chiller shown and described herein.

The tea is directed from the chiller into conduit 50, which is fluidically connected to the dispenser 24 by a pair of branch lines 56 and 58. Line 56 is fluidically connected to dispensing head 60 on dispenser 24. When the dispensing head 60 is actuated, chilled tea will be dispensed. The exact temperature of the tea will depend on the distance the tea must travel through conduit 50 between the chiller and the dispenser head 60. However, even if the dispenser 24 is located some distance from the chiller, the dispensed tea should still be cool enough so that little or no ice is melted, thus avoiding dilution of the tea. Although only one dispenser 24 is shown and discussed, multiple dispensers may easily be connected to the system. For example, a large fast food restaurant with a drive-in window may use one dispenser at the drive-in window and two or more dispensers at the counter.

One type of dispenser preferred for use with the present system is the Pressurized LBBD Dispenser with SF-1 Valve manufactured by The Cornelius Company of Anoka, Minn. This type of dispenser is ideally suited for dispensing both plain tea and presweetened tea in accordance with the method and system described herein.

The tea is moved under pressure throughout the fluid lines and conduits of the present system from the tea supply 12 to the dispenser 24 by the pump 18 assisted by a compressor 22. A type of compressor preferred for this purpose is one that uses air from outside the compressor to propel the liquid tea through the fluid conduits and lines as described above. This type of compressor takes in surrounding air and purifies and dries it to produce a propellant suitable for use with beverages. A compressor designed for this purpose which is preferred for use in the present system is the MAXIE-AIRE manufactured by KMC, an Alco Foodservice Company. The air generated by the compressor 22 to be used as the beverage propellant is directed into air line 64. A gauge 66 is provided to measure the air line pressure. A pressure regulator 68 is also provided to permit adjustment of the pressure as required. A branch air line 70 directs the air propellant into the tea supply 12 at tank 36. A solenoid valve (not shown) is employed to bleed air from the tea reservoir 40, when required. This may be used both to release trapped air and to expedite transfer of tea from the supply tank 36 to the tea reservoir 40. Appropriate valves and connectors (not shown) are provided as needed to control the pressure in the fluid lines and conduits and to direct the propellant to the desired locations in the present beverage dispensing system.

The brewing and dispensing system of the present invention has been described to this point primarily with respect to the brewing and dispensing of plain tea. However, a critical feature of the present system is its capability to dispense a very high quality presweetened tea. As previously mentioned, such tea is extremely popular in the Southeastern United States, where it is usually requested by restaurant patrons all year round. Up to now, a fresh, consistently high quality presweetened iced tea has not been available to fast food or other restaurant outlets to be dispensed along with other beverages. The presweetened tea currently on the market falls short of being a high quality product which customers are likely to request more than once and, moreover, deteriorates rapidly once its container is opened. The present invention, however, includes a specially formulated sweetener which is kept fresh according to the system and method described herein and thus produces a superior fresh iced tea when mixed with tea and ice.

The present invention includes, in addition to the tea circuit, a sweetener circuit that circulates liquid sweetener from the sweetener supply 14 through the chiller 16 to the dispenser 24. The liquid sweetener is prepared as will be described in detail hereinbelow and is placed in a stainless steel can or tank 72 equipped for pressurization. Tank 72 preferably has about a five gallon capacity, although a smaller tank might be more suitable for a restaurant or fast food outlet that does not serve a large volume of presweetened iced tea. Air from the compressor 22 is directed from air line 64 through branch 74 into the sweetener tank. The pump 20 assists the compressor to propel the sweetener under pressure into sweetener line 76 and through the line 76 into sweetener coils (not shown) in the chiller that are separate from the tea coils. The chilled sweetener exits the chiller 16 and flows into a conduit 78 which transports the sweetener directly to the dispenser 24. A sweetener return line 80 is provided to circulate the undispensed sweetener back to the sweetener supply 14.

At the dispenser 24 the sweetener and tea are mixed prior to being dispensed from dispenser head 62 so that the liquid which flows from the dispenser head is freshly sweetened tea. In contrast to the currently available presweetened teas, the present system does not maintain the tea in a sweetened condition, but maintains the tea and sweetener in separate lines until these lines reach the dispenser. The result of this is that both the tea and the sweetener remain fresher and retain their quality. Suitable connectors and valves (not shown) are provided at the dispenser to mix a selected quantity of sweetener with the tea in a predetermined ratio during the dispensing of the beverage as the dispensing head 62 is activated.

The sweetener is maintained in a chilled condition and under constant circulation, thereby avoiding the crystallization of sugar in the sweetener conduits 76, 78 and 80. Crystallization of sugar could result in a loss of sweetening power of the sweetener or a blockage of the sweetener lines. The specific formulation of the sweetener moreover, also minimizes the likelihood that crystallization will occur.

The sweetener circulated in the sweetener lines of the present invention is specifically formulated to remain liquid in a chilled environment such as that created by the system described herein. The sweetener is preferably prepared in syrup form using filtered water. It is further preferred that the filtered water contain less than 100 ppm total dissolved solids and meet the taste, odor and particulate reduction criteria set forth in Standard No. 42 of the National Sanitation Foundation Standards for Drinking Water Treatment Units. To prepare one gallon of the sweetener syrup, 11 cups of extra fine, pure cane granulated sugar is sifted and added to an equal amount (11 cups) of water filtered as described. Two teaspoons of light corn syrup, three grams of fructose and one teaspoon of clover honey are combined with the sugar and water and heated with constant stirring until the mixture boils, preferably in an open stainless steel container. The mixture is boiled for five minutes, removed from the heat and transferred to a sanitized air tight container. When the sweetener has cooled to ambient temperatures, it is refrigerated and maintained at refrigeration temperatures during shipment and storage to preserve freshness and quality.

Figure 2:
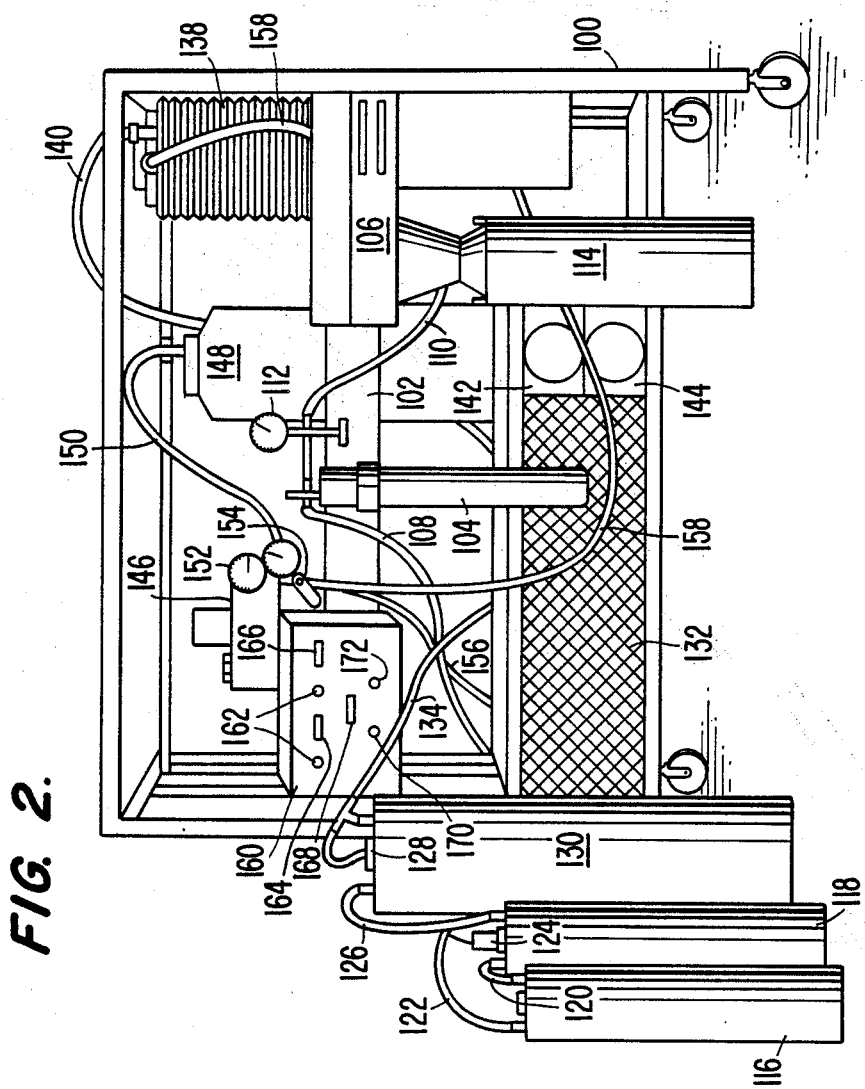
FIG. 2 is a side view of one configuration of the iced tea brewing and dispensing system of the present invention.

FIG. 2 illustrates one possible arrangement of the components of the present tea brewing and dispensing system. In this arrangement, all of the components are mounted on or positioned adjacent to a mobile cart 100, which allows the basic components of the system to be moved if required. The cart should ideally include adjustable shelves and mounting brackets that may be positioned horizontally or vertically at the locations desired.

The cart shown in FIG. 2 includes a horizontal bracket 102 on which is mounted a water filter 104 and a tea brewer 106. A flexible water line 108 carries water to the filter from a water supply (not shown). A second flexible water line 110 carries filtered water to the tea brewer 106. A gauge 112 may be provided to monitor the pressure of the water supplied to the tea brewer. The brewed tea is collected in a transfer tank 114 which is preferably a stainless steel tank capable of being pressurized. Two similar transfer tanks 116 and 118 provide the tea supply in this arrangement. However, other numbers of tanks could be used. The tanks 116 and 118 are connected in series to each other by a flexible tea conduit 120. Line 122 provides compressed air to tank 116 from the compressor 146. Tank 118 is provided with an alarm including a float switch (not shown) to detect the level of the tea in the tank and, therefore, functions as the tea alarm. A sensor (not shown) for the float switch is provided in a sensor unit 124. The sensor is connected to a remote alarm (not shown) which will provide a signal when the level of the tea reaches a predetermined low point in the tea alarm tank 118. It is preferred to provide both an audible and a visual signal to signal that the tea level is low. The audible signal will alert the restaurant employees that the system needs to be checked, and the visual signal can be used to direct employees specifically to check the tea supply.

A third tea tank 128 is provided with an insulated jacket and cover 130 and 126 functions as the tea reservoir. Flexible tea conduit 126 connects tea alarm tank 118 to tank 128. This tank 128 is connected directly to a chiller 132 through a tea line 134. The tea is then circulated through tea coils (not shown) in the chiller 132 and from the chiller to a dispenser (not shown) at a location remote from the mobile cart 100. Undispensed tea is returned to the tank 128 by line 136 so that the jacketed tank 128 functions as a reservoir for the chilled tea.

The sweetener supply is kept in a jacketed insulated tank 138. A flexible sweetener line 140 conveys sweetener to the chiller 132 where it is chilled by circulating it through coils (not shown) separate from the tea coils. The chilled sweetener is conveyed to a dispenser (not shown) where it is mixed with tea during dispensing. If the sweetener is not to be dispensed, it will not be mixed with tea, but will be returned by a sweetener return line (not shown) to the jacketed sweetener tank 138. The insulation around the sweetener tank helps to maintain the sweetener in a chilled condition. An alarm including a float switch (not shown) connected to a sensor (not shown) is also provided for the sweetener tank to permit the sensing of the sweetener level. The alarm is activated by the sensor when the sweetener level falls below a preset level, preferably to produce both an audible and a visual signal to restaurant employees. This part of the brewing and dispensing system is particularly important since only one sweetener tank is usually used, and it is essential to the proper operation of the system to know when the sweetener needs to be replenished so that an adequate supply of sweetener can be maintained at all times.

A pair of pumps 142 and 144 is mounted adjacent to the chiller 132. Pump 142 circulates the tea and pump 144 circulates the sweetener through the chiller 132. The pumps are preferably made of stainless steel, such as those sold under the PROCON name.

The air compressor 146 required to propel the tea and sweetener under pressure to the chiller 132 and the dispenser (not shown) is also mounted on the mobile cart 100. A stainless steel air receiver 148, preferably about five gallons in size, is also mounted on the mobile cart to receive and store the compressed air produced by the compressor 146. Air line 150 provides a fluid connection between the compressor 146 and the receiver 148. At least one gauge 152 and a pressure regulator 154 are connected to the compressor 146 to monitor and regulate the pressure of the compressed air used to move the tea and sweetener. Air line 156 directs compressed air to the tea supply, and air line 158 directs compressed air to the sweetener supply.

A supply of water to be used in flushing the system should also be provided. This may take the form of a water reservoir mounted on the mobile cart 100 with the other system components. Alternatively, a suitable connector by which the system may be connected to the restaurant's water supply could be included in the system. Other water supply means which achieve the purpose of providing sufficient water to flush the system may also be employed with the present invention, however.

A control panel 160 is provided with switches 162 for the chiller 132 and pumps 142 and 144. The visual signals for the tea alarm and sweetener alarm, which are preferably lights 164,166 that are lighted in response to the sensed low levels of tea and/or sweetener, are also most conveniently located on the control panel. In addition, an air bleed switch 168 that activates an air bleed valve (not shown) to evacuate air from the system and valves 170,172 to activate the "drain" and "flush" functions required to clean the system as will be described hereinbelow are preferably included on the control panel. Any other control elements and/or gauges required for the system may also be included in the control panel.

The system also includes valves in appropriate locations (not shown) to regulate the flow of tea, sweetener, air and water. In addition, drain lines (not shown) are provided to assist in flushing the tea lines, which should preferably be done each day. A pair of three way valves (not shown) is provided for this purpose. One three way valve allows the tea to be directed to the drain rather than to the tea reservoir 128. A second three way valve allows the air pressure to the supply tank 116 to be turned off and water for flushing the tea lines to be turned on instead.

The tea lines should be sanitized at least once a week. This is accomplished simply by disconnecting the tea supply tank or tanks and attaching in their respective places a supply of an appropriate sanitizing agent. The sanitizing agent can easily be propelled through the system and out through the dispenser heads by the compressor. This sanitizing step should be followed by thoroughly flushing the system with water to remove all traces of the sanitizing agent from the system so that the agent will not be present when tea and sweetener are again circulated through the system. Flushing and sanitization of the sweetener lines can be accomplished in a similar manner.

The system components shown in FIG. 2 can be located in an area remote from where the presweetened and unsweetened tea are actually dispensed by providing sufficient lengths of the flexible beverage lines preferred for use with the present system to convey both the tea and the sweetener from the chiller to the dispenser or dispensers. This arrangement is especially suitable for a restaurant with a drive-in window because only the relatively small dispenser unit must be kept near the window. The additional components can be located wherever there is sufficient space.

The arrangement shown in FIG. 2 is meant to illustrate only one possible arrangement of the components of the iced tea brewing and dispensing system of the present invention. These components can be arranged in many other configurations to produce the basic system described herein, and such component configurations are contemplated to be within the scope of the present invention.

The present invention also encompasses a method of brewing and dispensing fresh, high quality iced tea, which may be either unsweetened or sweetened prior to dispensing, employing the system components described herein. The method includes brewing a supply of tea from high quality fresh tea leaves, chilling the tea, conveying the chilled tea to a dispenser to be dispensed, and maintaining the undispensed tea in a chilled condition under continuous circulation until it is actually dispensed. A supply of a high quality liquid sweetener especially formulated to remain liquid in a chilled state is simultaneously chilled and conveyed to a dispenser where it is mixed with tea during dispensing. The undispensed sweetener is maintained in a chilled condition under continuous circulation until it is actually dispensed.

Industrial Applicability

The iced tea brewing and dispensing system and method of the present invention will find its primary applicability in restaurants of the "fast food" type, particularly those with drive-in windows. However, this system and method is ideally suited for any type of restaurant or food service institution which desires to serve its patrons fresh, high quality presweetened or unsweetened iced tea and which prefers to locate the system components in a location remote from the actual tea dispensing location.

I claim:

1. A brewing and dispensing system for presweetened iced tea including brewing means for brewing a supply of tea from fresh tea leaves, a supply of sweetener specifically formulated to remain in a liquid state when the sweetener is in a chilled condition, chiller means fluidically connected to the tea supply and the sweetener supply for maintaining the tea and the sweetener in a chilled condition, circulating means for maintaining the tea and the sweetener under constant circulation while the tea and the sweetener are in said chilled condition, dispenser means fluidically connected to said chiller means for dispensing a preselected ratio of sweetener and tea, and compressor means for propelling tea from the tea supply and sweetener from the sweetener, supply to the chiller means, tea and sweetener from said chiller means to said dispenser means, and undispensed tea and sweetener from said dispenser means to each respective supply 2. The brewing and dispensing system described in claim 1, further including tea reservoir means and sweetener reservoir means for storing a quantity of undispensed tea and a quantity of undispensed sweetener in a chilled condition.

3. The brewing and dispensing system described in claim 1, wherein said tea supply includes freshly brewed tea stored in a plurality of tanks fluidically connected to each other and to said chiller means.

4. The brewing and dispensing system described in claim 3, further including fluid level detection means for monitoring the respective levels of tea and in said tea supply and sweetener in said sweetener supply.

5. The brewing and dispensing system described in claim 4, wherein said fluid level detection means includes a float switch and an alarm activated by said float switch when the level of tea or sweetener falls below a predetermined low point.

6. The brewing and dispensing system described in claim 5, wherein said sweetener comprises filtered water, granulated cane sugar, corn syrup, fructose and honey.

7. The brewing and dispensing system described in claim 5, wherein the tea and the sweetener are conveyed through the system under pressure.

8. The brewing and dispensing system described in claim 1, wherein said dispenser means includes a dispensing conduit fluidically connected to said chiller means to permit the dispensing of tea alone without sweetener.

9. The brewing and dispensing system described in claim 1, wherein said brewing means includes a source of water, filter means for filtering said water, and high volume tea brewing means for quickly brewing a large quantity of tea from fresh tea leaves.

10. The brewing and dispensing system described in claim 1, wherein said dispenser means is located at a location remote from said tea supply, said sweetener supply, said chiller and said circulating means.

11. A system for brewing high quality iced tea at a first location and dispensing chilled tea in both a sweetened and in an unsweetened condition at a second location remote from the first location, including a source of water, filtration means for filtering water from the source to produce a quantity of filtered water sufficient to brew a supply of tea from fresh tea leaves, first insulated reservoir means for storing said supply of tea, second insulated reservoir means for storing a supply of liquid sweetener specifically formulated to remain liquid when chilled, first conduit means for fluidically connecting each said reservoir means to chiller means including a plurality of lines for tea and a plurality of separate lines for sweetener inside said chiller means for chilling the tea and the sweetener, tea circulating means and sweetener circulating means for continuously circulating the tea and the sweetener through said conduit means to chill said tea and said sweetener, second conduit means for fluidically connecting said tea lines and said sweetener lines in said chiller means to a dispenser means for selectively dispensing either chilled tea or a mixture of chilled tea and chilled sweetener in a preselected ratio, return conduit means for carrying undispensed tea and undispensed sweetener to said first and said second reservoir means and compressor means for providing a supply of pressurized air to propel said tea and said sweetener from each said reservoir means under pressure through said chiller means to said dispenser means and back to each said reservoir means.

12. The iced tea brewing and dispensing system described in claim 11, wherein said first conduit means, said plurality of lines inside said chiller means and said second conduit means are arranged to keep the tea completely separate from the sweetener as the tea and the sweetener are propelled from each said reservoir means to the dispenser means.

13. The iced tea brewing and dispensing system described in claim 12, wherein said dispenser means includes mixing means for mixing said chilled tea and said chilled sweetener in a predetermined ratio when said dispenser means is actuated to dispense presweetened tea.

14. A liquid sweetener for use in the iced tea brewing and dispensing system described in claim 11, wherein said sweetener comprises equal amounts of filtered water and sucrose and minor amounts of light corn syrup, fructose and honey.

15. The iced tea brewing and dispensing system described in claim 11, further including water supply means fluidically connected to said system for providing a supply of water for flushing said system.

16. The iced tea brewing and dispensing system described in claim 15, further including drain means for draining tea from the system and valve means fluidically connected between said water supply and said tea lines actuatable to direct water from said water supply through said tea lines to flush said system.

* * * * *